US008479181B2

(12) United States Patent
Andrade et al.

(10) Patent No.: US 8,479,181 B2
(45) Date of Patent: Jul. 2, 2013

(54) INTERACTIVE CAPACITY PLANNING

(75) Inventors: Henrique Andrade, Croton-on-Hudson, NY (US); Bugra Gedik, White Plains, NY (US); Andrew L. Frenkiel, Irvington, NY (US); Rohit M. Kandekar, Elmsford, NY (US); Joel L. Wolf, Goldens Bridge, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 12/697,624

(22) Filed: Feb. 1, 2010

(65) Prior Publication Data
US 2011/0191759 A1 Aug. 4, 2011

(51) Int. Cl.
*G06F 9/45* (2006.01)
(52) U.S. Cl.
USPC .......................................... 717/151; 717/140
(58) Field of Classification Search
USPC .......................................................... 717/151
See application file for complete search history.

(56) References Cited

U.S. PATENT DOCUMENTS

| | | |
|---|---|---|
| 2006/0070060 A1* | 3/2006 | Tantawi et al. ............... 717/174 |
| 2006/0161884 A1* | 7/2006 | Lubrecht et al. .............. 717/104 |
| 2008/0092122 A1* | 4/2008 | Caprihan et al. .............. 717/127 |

OTHER PUBLICATIONS

U.S. Appl. No. 12/130,043, filed May 30, 2008 titled, Method for Generating a Distributed Stream Processing Application.
U.S. Appl. No. 12/489,605, filed Jun. 23, 2009, titled, Partitioning Operator Flow Graphs.
U.S. Appl. No. 12/465,910, filed May 14, 2009, titled, Dynamically Composing Data Stream Processing Applications.
Gedik et al., SPADE: The System S Declarative Stream Processing Engine, SIGMOD'08, Jun. 9-12, 2008, pp. 1123-1134.

* cited by examiner

*Primary Examiner* — Chun-Kuan Lee
*Assistant Examiner* — Brooke Taylor
(74) *Attorney, Agent, or Firm* — Ryan, Mason & Lewis, LLP

(57) ABSTRACT

Techniques for performing capacity planning for applications running on a computational infrastructure are provided. The techniques include instrumenting an application under development to receive one or more performance metrics under a physical deployment plan, receiving the one or more performance metrics from the computational infrastructure hosting one or more applications that are currently running, using a predictive inference engine to determine how the application under development can be deployed, and using the determination to perform capacity planning for the applications on the computational infrastructure.

25 Claims, 3 Drawing Sheets

INTERACTIVE CAPACITY PLANNING

GOVERNMENT CONTRACT

This invention was made with Government support under Contract No.: H98230-07-C-0383 awarded by the United States Department of Defense. The government has certain rights in this invention.

FIELD OF THE INVENTION

Embodiments of the invention generally relate to information technology, and, more particularly, to compile-time capacity planning for distributed computing applications.

BACKGROUND OF THE INVENTION

Large computational infrastructures such as, for example, a private cluster of workstations (COW) or a public cloud computing environment, are typically shared by multiple applications. The applications themselves might be distributed, where several application components can be spread over different physical processing nodes.

An application is a collection of distributed components, where a component is an independently schedulable unit. The distributed components interact via message passing, stream connections, and/or remote procedure calls. An application is characterized by a single performance metric referred to herein as quality of service (QoS), which can include, for example in finance engineering applications, the rate of data ingestion in messages per second and the rate of results produced and/or throughput in executed trades per second. The QoS metric is computed as a function of multiple variables including, for example, the component-specific metrics that characterize how fast these components operate and how much computational resources are used.

SUMMARY OF THE INVENTION

Principles and embodiments of the invention provide techniques for interactive capacity planning. An exemplary method (which may be computer-implemented) for performing capacity planning for applications running on a computational infrastructure, according to one aspect of the invention, can include steps of instrumenting an application under development to receive one or more performance metrics under a physical deployment plan, receiving the one or more performance metrics from the computational infrastructure hosting one or more applications that are currently running, using a predictive inference engine to determine how the application under development can be deployed, and using the determination to perform capacity planning for the applications on the computational infrastructure.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
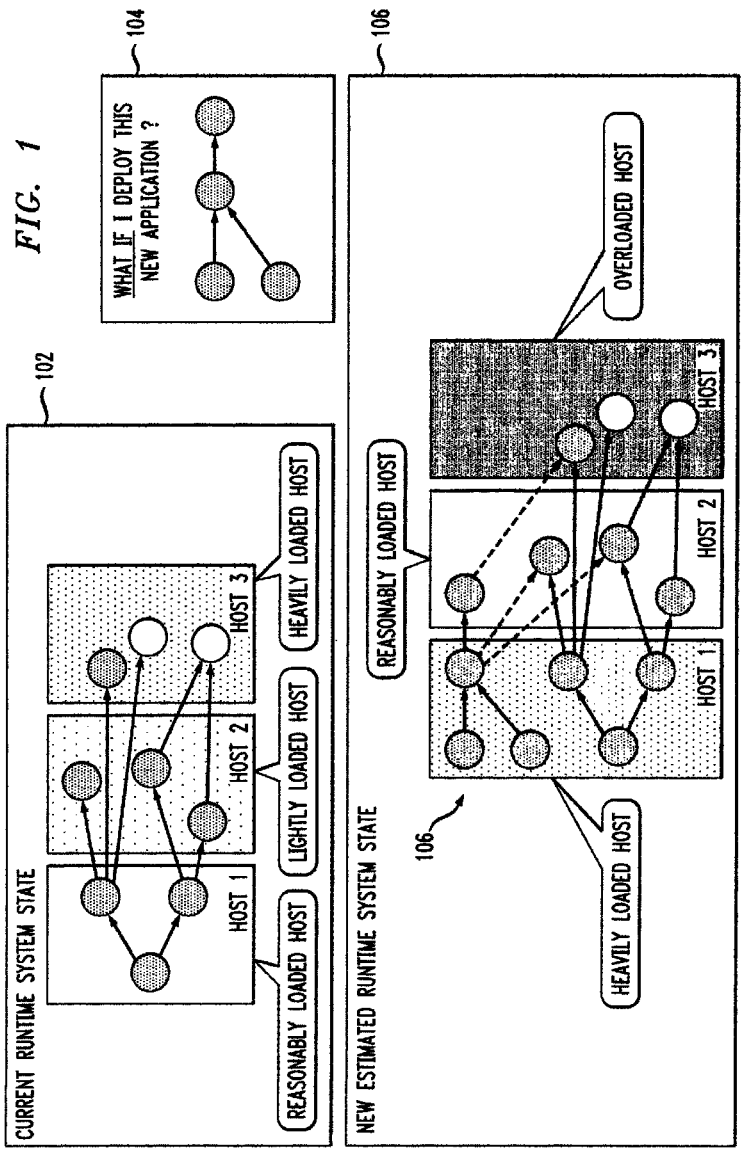
FIG. 1 is a diagram illustrating run-time system states, according to an embodiment of the invention.

Principles of the invention include interactive capacity planning for distributed applications. One or more embodiments of the invention detail how an application can be profiled at different work levels to estimate the sizes of components and the communication and inter-dependency overhead between components. The components may have several placement constraints such as, for example, resource-matching to specific hosts (or a collection of hosts), co-location, or ex-location. These constraints implicitly specify (often exponentially many) alternate placement patterns for the application.

Alternatively, an application can also come with an explicit list of placement-patterns. The profiling of an application is used to determine the possible maximum QoS (considering some of the alternate placements) as well as a tolerable QoS based on input from the application administrator (for example, it might be stated by the application administrator that a new finance engineering application must be able to cope with the arrival of 50,000 messages per second). Additionally, all applications running on an environment (for example, a shared environment) can be described in this way.

The techniques detailed herein also include performing capacity planning and answering what-if questions as an application administrator gets ready to deploy a new application on top of the computational infrastructure. Typical questions one might want answered include, for example, whether the application fits on a pre-determined set of nodes, what adjustments can be made to the application to make it fit on this same set of nodes, if the system can find a set of nodes and a placement where the application might fit, etc. The definition of whether an applications fits or not can be given by whether any of the QoS metrics of the applications already running on the system (or of the new application to be deployed) falls below the tolerable QoS threshold.

As detailed herein, it is not always clear how deploying an application will affect other applications. In some cases, the resource sharing is indirect (that is, the fact that components belonging to two distinct and independent applications are co-located on the same host creates a situation where they are competing for the same underlying resources such as central processing unit (CPU) cycles, I/O bandwidth, and memory). In other cases, the interdependencies can be more direct. In a stream processing environment or in distributed computing platforms, the deployment of a new application can create a new data consumer or new data producer relationship. Specifically, the new application might become a data source to an application that is already running, or it might become a data consumer for, for example, a stream being produced by an already running application. In such cases, not only is there additional load imposed by the new application, but the new application will directly exert additional load on existing applications.

As described herein, one or more embodiments of the invention include providing compile-time, run-time, optimization, and inference and/or prediction mechanisms to support capacity planning decisions and what-if analysis for distributed computing platforms. Also, one or more embodiments of the invention include providing workflows and tooling necessary to provide an interactive experience when an analyst is faced with the problem of how to deploy a new application onto that distributed computing platform.

In contrast to the disadvantages of existing approaches, one or more embodiments of the invention rely on an integrated instrumentation mechanism for performance and application understanding, which provides the raw performance data gathering capabilities used for carrying out and driving the what-if analysis process. Additionally, the techniques detailed herein also include employing a reasoning mechanism implemented by a predictive inference engine that can be used for evaluating an application deployment plan and assess whether it is feasible to run the application as-is or, alternatively, whether to consider modifying the placement for the new application, preferentially affecting only the new application alone or, if needed, also the applications that are already running, or, yet, further suggesting how to augment the computational resources to accommodate the additional workload. Further, one or more embodiments of the invention can also provide workflows and a visualization-driven environment that permits analysts to interactively explore alternative deployment plans and evaluate their impact on the new application as well as on the applications that are currently running.

By way of example, one or more embodiments of the invention can be described within the context of distributed run-time infrastructure and programming models developed as part of a general purpose data stream processing middleware, such as, for example, INFOSPHERE STREAMS. One or more embodiments of the invention can be implemented in the context of the SPADE language and compiler, and an INFOSPHERE STREAMS stream processing system, commercially available from International Business Machines Corporation of Armonk, N.Y. SPADE stands for "Stream Processing Application Declarative Engine," a programming language and compilation infrastructure specifically built for streaming systems. The SPADE programming model is more fully described by Gedik et al. in "SPADE: The System S Declarative Stream Processing Engine," SIGMOD Conference 2008: 1123-1134.

The middleware can execute a large number of long-running applications. Applications can interact as part of a single application or a set of related applications, for example, by taking the form of complex data-flow graphs. A data-flow graph can include a set of processing elements (also referred to herein as run-time execution units) connected by data streams, where each data stream carries a series of tuples. The processing elements are containers that host operators (or, in general terms, components) that implement data stream analytics and are distributed on compute nodes. The compute nodes can be organized, for example, as a shared-nothing cluster of workstations or as a large supercomputer. The processing elements communicate with each other via their input and output ports, which are connected by the data streams, and the processing element ports, as well as the data streams, are typed, employing application-defined type systems (which can be built, for example, by combining basic types that range from numeric types such as eight-bit integers to complex types such as lists of basic type elements).

Processing elements can be explicitly connected using hard-coded stream connections defined at compile-time or can be dynamically connected through streams that rely on properties of data streams (for example, "streams that carry surveillance video from cameras located in Building A"). Note that these connections are dynamic (that is, made at run-time, upon the availability of a stream that matches a subscription expression) and, therefore, allow the middleware to support incremental application development and deployment.

FIG. 1 is a diagram illustrating run-time system states, according to an embodiment of the invention. By way of illustration, FIG. 1 depicts how one or more embodiments of the invention can be used by an application administrator. In particular, it depicts image 102, the current state of a distributed computational platform and the applications running on it. Also, FIG. 1 depicts image 104, a representation for a new application to be deployed. Additionally, FIG. 1 also depicts image 106, which shows the impact of this new application if it is to be deployed alongside the existing ones. Note that the interconnection between the new application 102 and the other applications already deployed in the run-time environment as seen in image 106 are established based on producer/consumer relationships expressed by these applications. This can take the form of export/import points using stream exporting and importing primitives in the SPADE language or, similarly, message sending/receiving primitives that exist in other distributed programming models. This is described, by way of example, in U.S. patent application Ser. No. 12/465,910, the disclosure of which is incorporated by reference herein.

A declarative language such as the INFOSPHERE STREAMS SPADE language is seen in FIG. 1. The language provides a rapid application development front-end that includes a plurality of features. For example, one of these features is a language for flexible composition of parallel and distributed data-flow graphs. This language can be used directly by programmers, or can be used between task-specific higher level programming tools (for example, for querying, composition of map-reduce flows, or the like) and lower-level application programming interfaces (APIs). A second feature includes extensibility based on support for adding new toolkits of type-generic stream processing operators. A third feature includes a broad range of edge adapters that are used to ingest data from external sources and to publish results to external consumers (for example, network sockets, databases, file systems, proprietary platforms, etc.).

The programming language provides a stream-centric, operator-based programming model, as well as the syntactic constructs whereby an application can import from or export data to other applications via the mechanism detailed herein, as depicted by FIG. 1.

The stream-centric design implies a language where the basic building block is a stream. In other words, an application writer can quickly translate the flows of data from a block diagram such as the ones depicted by FIG. 1 into the application source code simply by listing the stream flows and stating which operator generates individual streams. The operator-based programming is focused on designing the application by reasoning about the smallest possible building blocks necessary to deliver the computation an application is designed to perform.

As described herein, multiple applications can interoperate by consuming and producing streams that cross application boundaries. The application composition permits the development of dynamic topologies where different applications are possibly deployed at different times and producer-consumer relationships between them are established at run-time. In other words, every time a new application is instantiated, the dataflow management component in one or more embodiments of the invention assesses whether that new application is producing and exporting any streams that might be of interest to other running applications.

Likewise, the INFOSPHERE STREAMS dataflow management component inspects the already running applications and verifies whether any of them produces and exports streams that are of interest to the newly deployed application. Once new producer-consumer relationships are found, the dataflow management component can instruct that producers connect to consumers. These connections seen in FIG. 1 are ephemeral in the sense that they are automatically removed once one of the parties (producer or consumer) terminates, subscriptions are changed, or data source properties are changed and potentially no longer match subscriptions.

As detailed herein, one or more embodiments of the invention include addressing emerging issues on top of the computational infrastructure (cloud computing, cluster computing), such as, for example, performing capacity planning and answering what-if questions as an application administrator gets ready to deploy a new application. Typical questions one might want answered can include, by way of example, whether the application will fit on a pre-determined set of hosts, determining what adjustments can be made to the application to make it fit on this same set of hosts, whether the system can find a set of hosts and a placement where the application might fit, etc. As used herein, "to fit" means whether any of the QoS metrics of either the applications already running on the system or of the new application to be deployed fall below the tolerable QoS thresholds stated by the application administrators.

Figure 2:
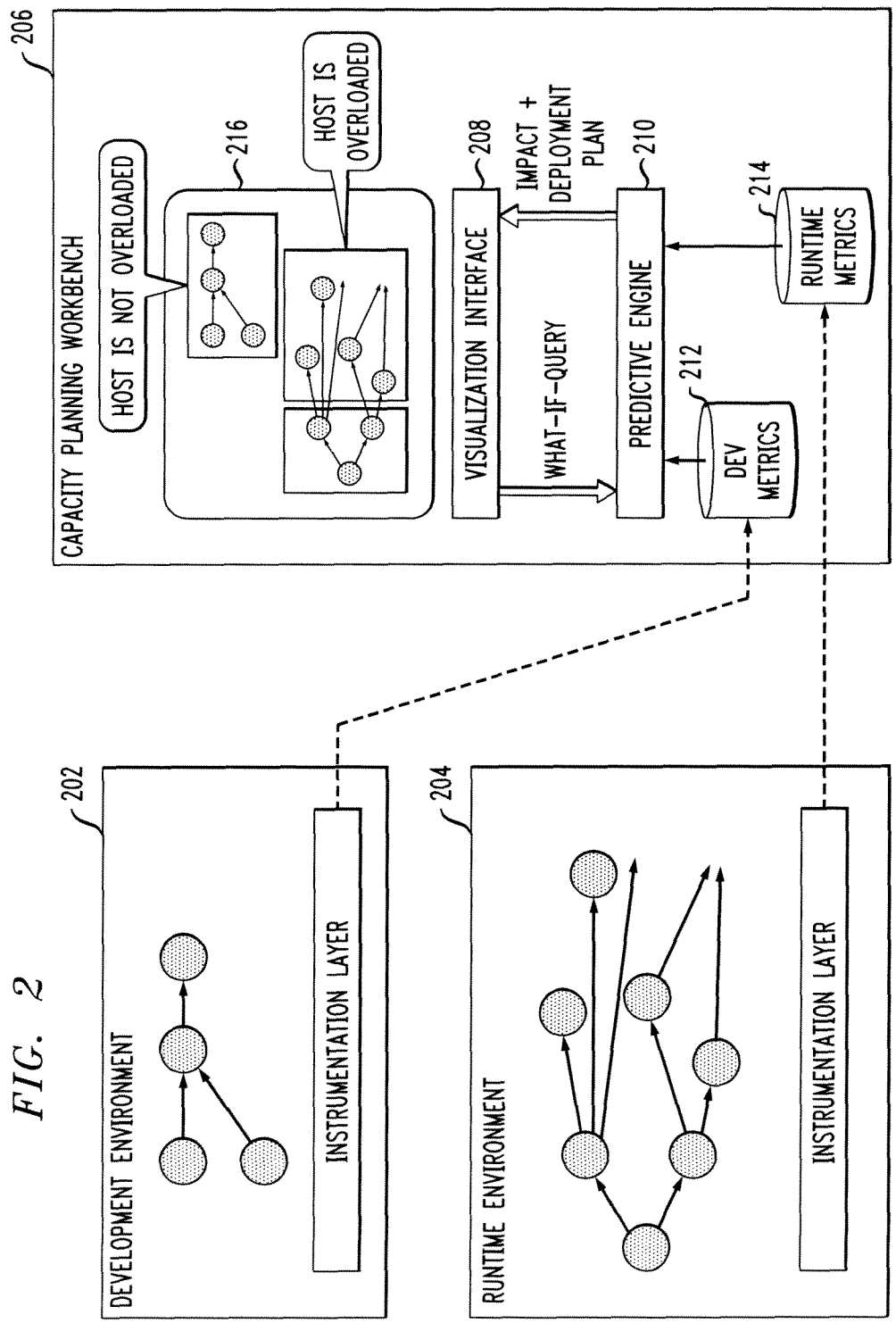
FIG. 2 is a diagram illustrating a system of components to perform capacity planning for applications running on a computational infrastructure, according to an embodiment of the invention.

To provide answers to the questions above, an apparatus can be provided by one or more embodiments of the invention, as detailed, for example, in FIG. 2. FIG. 2 is a diagram illustrating a system of components to perform capacity planning for applications running on a computational infrastructure, according to an embodiment of the invention. By way of illustration, FIG. 2 depicts a capacity planning workbench 206 used by an application administrator and its integration with a compile-time instrumentation layer 202 and run-time instrumentation layer 204. FIG. 2 also depicts the predictive inference engine 210 used by the workbench 206 with input from development/compile-time metrics management module 212 and a run-time metrics management module 214 to analyze the what-if scenarios posed by the application administrator (for example, via a visualization interface 208).

Additionally in FIG. 2, component 216 includes a mockup for what the visualization might look like; that is, a topological representation of the interconnected applications, which in turn can be used to anchor the specific performance metrics, justifying that a placement is acceptable from a capacity planning perspective or that a placement is not feasible because a particular constraint is violated.

As illustrated in FIG. 2 and as also described herein, one or more embodiments of the invention can include components such as, for example, a development-time instrumentation component, a compile-time optimizer (such as, for example, described in U.S. patent application Ser. No. 12/130,043, the disclosure of which is incorporated by reference herein), a deployment-time instrumentation component, an offline what-if predictive engine, and a what-if graphical user interface (GUI) decision tool.

With a development-time instrumentation component (such as component 202 in FIG. 2), the compile-time instrumentation framework inserts instrumentation probes in an application as part of a code generation step. The instrumentation probes include additional processing logic whereby certain metrics are sampled and collected as an application is run on a trial-basis with sample workloads. The collected metrics on a per-distributed component basis are summarized as a set of samples or a probability distribution and include, but are not limited to, external data consumption rates, data production rates, central processing unit (CPU) usage, and memory usage.

A compile-time optimizer can be used to provide a deployment plan for a multi-component application that satisfies placement and runtime constraints. It employs data gleaned from trial runs and the logical application description in a high-level language to generate a physical deployment plan. By way of example, the optimizer can make use of the teachings from U.S. patent application Ser. No. 12/489,805, the disclosure of which is incorporated by reference herein, but in one or more embodiments of the invention it can be extended to include additional workload and constraints obtained from the run-time environment. For example, certain hosts might already be overloaded or utilizing certain data sources might cause existing applications to violate the QoS thresholds established by application administrators.

Additionally, with a deployment-time instrumentation component, applications are deployed with run-time instrumentation capabilities, capturing and storing the same metrics that can be collected at development time. In one or more embodiments of the invention, the system infrastructure can provide the capability of querying and retrieving this data on-demand.

A what-if predictive inference engine (such as component 210 in FIG. 2) can be used to answer the capacity planning questions outlined above. Such an engine employs development-time metrics for the new application and deployment-time metrics retrieved from the run-time environment for applications that are already running. Also, the engine is able to perform assessment of QoS threshold violations indicating that a new application cannot be deployed as-is without affecting quality-of-service parameters for the new and existing applications. The engine is also able to explore alternative deployment plans by embodying a model for the application QoS as a function of the component-based metrics. This model permits the predictive inference engine, for example, to experiment with alternative deployment plans for the new application or even require a modification of application layouts for applications that have already been deployed in search for a feasible arrangement where all of the applications fit (that is, where there is no violation of tolerable QoS thresholds for any application).

Also, with a what-if graphical user interface (GUI) decision tool (such as, for example, component 208 in FIG. 2), the analyst or application developer performing a capacity planning evaluation for a new application can be guided by a visualization interface that integrates a view of an application to be deployed together with a dynamic view of the current run-time environment. Such an interface can employ the predictive inference engine to evaluate the feasibility of a deployment plan as well as alternative deployment plans, providing interactive cues on the predicted impact on the runtime environment. Changes in the application itself or in the deployment plan can be interactively round-tripped across the optimizer and predictive engine and reflected in the visualization interface for further analysis by the application developer.

As described herein, one or more embodiments of the invention can support a predictive inference mechanism that provides multiple services. For example, such a mechanism can assess whether the current deployment plan for the new application is feasible, and it can also explore alternative deployments that might affect both the new application as well as already running applications with the aim of finding a feasible deployment plan that accommodates the complete workload. Additionally, in one or more embodiments of the invention, use of an interference mechanism can include the following steps.

The first step can include determining if the given application can fit without moving the existing applications. This entails determining a feasible placement of the components such that the total workload assigned to a host is at most its capacity. This problem can be formulated, for example, as an integer linear program (ILP) and can be solved using standard techniques. If the ILP is prohibitively large, one can use a bin-packing algorithm such as dynamic programming or a longest processing time (LPT) scheme, appropriately modified so as to satisfy the placement constraints. These approaches can also be used to minimize the maximum (or average) overload of a host.

As detailed herein, one or more embodiments of the invention include use of a processing element scheduler. The formal processing element scheduler can be described as follows. One can define a decision variable $x_{p,h}$ to be 1 if processing element p is assigned to host h, and 0 otherwise. Also, one can let $R_p$ denote the set of resource matched hosts for processing element p. Those skilled in the art will recognize that host co-location defines an equivalence relation, which will be denoted by $\equiv_{HC}$. Host ex-location does not determine an equivalence relation, but one can define the set HE to be the set of pairs $(p_1, p_2)$ of ex-located processing elements. Also, one can denote the size (in millions of instructions per second, or mips) of a processing element p by SIZE(p). These sizes can be computed for new applications via an invention such as U.S. patent application Ser. No. 12/489,805, and for already-existing applications via an invention such as U.S. patent application Ser. No. 11/935,079, the disclosure of which is incorporated by reference herein. Assume, also, a list of existing hosts $H=\{h_1, \ldots, h_k\}$ with their CPU speed capacities $B_1, \ldots, B_k$, also in mips.

As described herein, one or more embodiments of the invention solve the following processing element scheduling problem:

$$\text{Minimize max}_h \sum_p \text{SIZE}(p) x_{p,h} / B_h \quad (1)$$

subject to $x_{p,h}=0$ if $h \notin R_p$, (2)

$x_{p_1,h}=x_{p_2,h} \forall h$, if $p_1 \equiv_{HC} p_2$, (3)

$x_{p_1,h}+x_{p_2,h} \leq 1 \forall h$, if $(p_1,p_2) \in HE$, (4)

$$\sum_h x_{p,h} = 1 \forall p, \quad (5)$$

$x_{p,h} \in \{0,1\} \forall p,h.$ (6)

The objective function (1) measures the maximum utilization of any host. Constraint (2) enforces the resource matching constraints. Constraint (3) enforces the co-location constraints. Constraint (4) enforces the ex-location constraints. Constraint (5) ensures that each processing element is assigned to one host. Also, constraint (6) ensures that the decision variables are binary. Additionally, in one or more embodiments of the invention, a commonly available optimization package can be used to solve this ILP. If the ILP is prohibitively large, those skilled in the art will recognize that one can use an approximation bin-packing algorithm, appropriately modified so as to force the placement constraints.

In one implementation of the processing element scheduler, one can specially modify the resource matching constraints so that each processing element in an already-running application is matched only to the host on which it is currently running. Specifically, one can let $P_o$ denote the set of existing processing elements and $h_{p,o}$ denote the current host assignment for processing element p in $P_o$. For such an already running p, one or more embodiments of the invention sets $R_p = \{h_{p,o}\}$.

If the processing element scheduling problem solves with an objective function less than or equal to 1 (or perhaps an analyst-specified maximum allowable utilization less than 1), then the current solution "fits" without moving any of the processing elements in already-running applications. The maximum host utilization is within the capacity of the host. Otherwise, one of two alternatives will occur, either the problem does not admit a feasible solution, or the maximum host utilizations will not be within the capacity of the hosts. In either case, one or more embodiments of the invention can conclude that it is not possible to fit the application without at least moving the existing applications. In this case, an analyst can resort to either of steps two, three or four.

The second step includes determining if the given application can fit with a possible movement of the components in the existing application. The objective here is to minimize the movement (or cost of the movement) of existing applications. This problem can also be formulated as an ILP, now including decision-variables corresponding to how the existing components are moved. Similar to step 1 above, one can also use bin-packing algorithms in this step.

Specifically, let the binary constant $x^o_{p,h}$ denote the current host assignment for an already existing processing element p in $P_o$. That is $x^o_{p,h}=1$ if processing element p is currently assigned to host h, and 0 otherwise. In this optimization problem, one or more embodiments of the invention use the original resource matching constraints for all processing elements. That is, one does not restrict $R_p$ to be a singleton set for p in $P_o$ as done in step one. The objective function is now the weighted sum of the original objective function and a cost of movement term. That is, the following is performed:

$$\text{Minimize } W_1 \left[\text{max}_h \sum_p \text{SIZE}(p) x_{p,h} / B_h\right] + \quad (7)$$

$$W_2 \left[\sum_{p \in P_o} \sum_h c_p |x_{p,h} - x^o_{p,h}|/2\right]$$

subject to constraints (2) through (6) and $$\sum_p SIZE(p) x_{p,h} / B_h \leq 1 \ \forall n \quad (8)$$

Here, $c_p$ denotes the cost of moving processing element p. Also, one can divide the second term in (7) by two because the cost $c_p$ of moving p is counted twice, once for the host it is currently assigned to and once for the host it is moved to. In one or more embodiments of the invention, the constants $c_p$ can be set to 1, in which case the right-hand side will correspond to the number of processing element moves. Alternatively, $c_p$ can be set to the size of the processing elements. $W_1$ and $W_2$ represent relative weights of the two terms in the objective function. In one or more embodiments of the invention, it can be assumed that $W_1+W_2=1$. Using $W_2=0$ implies that the model gives no consideration to the cost of moving the existing processing elements, so minimizing the maximum utilization becomes the only issue. Here, one or more embodiments of the invention can explicitly force the "fitting" of the processing elements onto the hosts via constraint (8). As long as a feasible solution exists, the utilizations will be within the capacities of the hosts given some possible movement of the already existing processing elements. Otherwise the analyst can resort to either step three or step four.

The relative weights $W_1$ and $W_2$ can be varied in the visualization tool by use of a slider. By evaluating and displaying the ILP results for several alternative tradeoff choices of $W_1$ and $W_2$, an analyst can use the visualization mechanism described herein to evaluate how much emphasis should be given to each of the two objective function terms. Thus, the visualization tool allows the analyst to perform a number of what-if analyses.

The third step is to determine if the given application can fit with a possible degradation in the performance (or QoS), if necessary, of the existing applications. The objective here is to minimize the maximum (or total) degradation in the performance. This step uses, as input, the profiling of how the sizes of existing application's components and inter-connects reduce when operated at low performance. This problem entails determining the work levels for each of the existing applications. If the number of alternate work levels of existing tasks is small, one can use ILP approaches similar to step one. If not, a combinatorial procedure such as, for example, a greedy scheme or local search scheme can be used.

One or more embodiments of the invention include using the notion of importance, which includes as a special case the notion of importance being the weighted sum of the rates of results produced, in other words at the terminal streams in an application. Also, it can be adapted to handle a wide variety of QoS metrics. This step can be run in either the no-move mode of step 1 or the movement allowed mode of step two.

By way of example, consider an analyst-chosen set of alternative performance levels to be considered for each of the existing applications or to the (weak) components of those applications. Those skilled in the art will recognize that multiple applications may be connected together into these components. One or more embodiments of the invention assume without loss of generality that each application is part of a single component. The number of alternative performance levels can be relatively small. They may be specified, for a given application, in terms of the amount of resources (mips, or sizes) given to each processing element in the application. Or they may be specified in terms of the aggregate resources given to each application, or even to the components formed by the various applications. By way of example, one might specify four possible successively better alternatives for a given application or component such as small, medium, large or existing. If one specifies a given alternative at the processing element level, one or more embodiments of the invention can use topological ordering methodology (such as, for example, described in U.S. patent application Ser. No. 11/374,399, the disclosure of which is incorporated by reference herein) to evaluate the overall importance of that alternative. If one specifies a given alternative at the level of aggregate resources, one can use topological ordering methodology as a sub-routine to the resource allocation optimization scheme described there to compute the best amount of resources given to each processing element in the application. This optimization maximizes importance rather than merely evaluating it. In either case, the output will include, for each application alternative, a size for each processing element, an aggregate size for the application and component, and a total importance for the application and component. These are input to the subsequent stages of step three.

In the next stage, one or more embodiments of the invention aggregates, if necessary, the amount of resources used by application alternatives into the amount of resources used by components. By way of example, let C be the set of weak components. At this point, one has an importance function $I_c$ for each component c. Each alternative corresponds to one value in in the domain of this function, and it consumes an amount m of resources (in mips) and produces an importance value $I_c(m)$. In one or more embodiments of the invention, one may remove any alternative which consumes more resources in a component but produces less importance. As such, the optimal total importance across all components may be found from these alternatives by solving the following problem:

$$\text{Maximize} \sum_c I_c(m_c) \quad (9)$$

subject to $$\sum_c m_c \leq B. \quad (10)$$

Here $$B = \sum_h B_h$$

represents the total resources available across all the hosts. This optimization problem may be solved, for example, by using a dynamic programming scheme such as that used by U.S. patent application Ser. No. 11/374,399. Furthermore, those skilled in the art will recognize that the scheme may easily be modified to produce some number, say k, of the best solutions. In one or more embodiments of the invention, these solutions can be ordered, if necessary, from best to worst (that is, from greatest total importance to least). The problem of finding the solution with the least degradation in performance is equivalent to the problem of finding the greatest (remaining) importance.

Additionally, these k solutions can be evaluated, in sequence, by either of the two ILPs to see if they produce a solution which fits. The choice of which ILP to use depends on whether one is in no-move or movement mode. The fact that the applications fit in aggregate does not guarantee that their processing elements will be assignable to the individual hosts. One or more embodiments of the invention can stop at the first such fitting solution. This corresponds to the alternative which decreases the performance least while fitting within the available hosts. On the other hand, one can also continue evaluating solutions past the first solution that fits, displaying all solutions which fit in the visualization tool, and allowing the analyst to consider multiple alternatives. Similarly, the invention could evaluate step three for both the no-move or movement case, providing the analyst with multiple what-if analysis options via the visualization tool.

The fourth step includes determining how to augment the capacity, if necessary, to accommodate the given application. The objective here is to minimize the capacity augmentation (or its cost). Whether or not the movement of existing applications is allowed, for this step, one can use bin-packing-like algorithms to fit maximum size of components into the existing capacity and using the remaining component sizes to estimate the capacity augmentation needed.

As before, this step can be accomplished in either the no-move mode of step one or the movement allowed of step two, or both. By way of example, consider an analyst-chosen set of alternative host types which can be used to augment the existing host environment. Presumably, the number of types will be relatively modest. If the cost of host type t is $COST_t$, then the total cost of purchasing $n_t$ hosts of each type t is $$\sum_t n_t COST_t.$$

It will be obvious to those skilled in the art that some number such as, for example, the k cheapest possible augmentation choices, can be found and ordered in order of increasing cost.

These k alternatives can be evaluated, in sequence, by augmenting the hosts appropriately and employing either of the two ILPs to see if they produce a solution which fits. Again, the choice of which ILP to use depends on whether one is in no-move or movement mode. As in step three, one or more embodiments of the invention can stop at the first such fitting solution. This corresponds to the alternative which has the least cost while fitting within the available hosts. On the other hand, one could also continue evaluating solutions past the first solution that fits, displaying all solutions which fit in the visualization tool, and allowing the analyst to consider multiple alternatives. Similarly, one or more embodiments of the invention could evaluate step three for both the no-move or movement case, providing the analyst with multiple what-if analysis options via the visualization tool.

Figure 3:
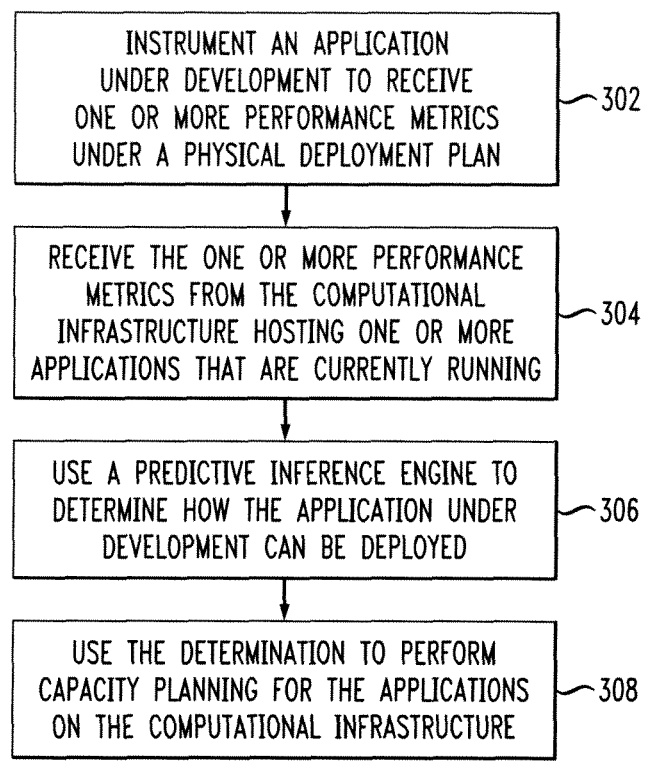
FIG. 3 is a flow diagram illustrating techniques for performing capacity planning for applications running on a computational infrastructure, according to an embodiment of the invention.

FIG. 3 is a flow diagram illustrating techniques for performing capacity planning (for example, interactive capacity planning) for applications (for example, multi-component applications) running on a computational infrastructure (for example, a shared computational infrastructure), according to an embodiment of the present invention. Step 302 includes instrumenting an application under development to receive one or more performance metrics under a physical deployment plan. Step 304 includes receiving the one or more performance metrics from the computational infrastructure hosting one or more applications that are currently running.

Step 306 includes using a predictive inference engine to determine how the application under development can be deployed. Using a predictive inference engine to determine how the application under development can be deployed can include determining whether a quality of service (QoS) threshold of any currently running application would be violated with deployment of the application under development. Also, using a predictive inference engine to determine how the application under development can be deployed can include determining a plan whereby all applications can run, wherein the plan includes changes in the application under development alone. Further, using a predictive inference engine to determine how the application under development can be deployed can additionally include determining a plan whereby all applications can run, wherein the plan includes changes in the applications that are already running and/or changes in the application under development.

Step 308 includes using the determination to perform capacity planning for the applications on the computational infrastructure.

The techniques depicted in FIG. 3 can also include performing capacity planning for one or more what-if scenarios. One or more embodiments of the invention can additionally include providing a visualization environment to carry out capacity planning what-if scenarios. Performing capacity planning for what-if scenarios can include, for example, determining whether a particular application deployment is feasible, as well as visualizing an impact of an application deployment plan on existing applications and the computational environment.

Additionally, capacity planning support for analyzing what-if scenarios can also include modifying a deployment plan and re-assessing the modified application deployment impact, as well as visualizing alternate deployment plans, wherein the alternate deployment plans include changes in the application under development and the already running applications. Performing capacity planning for what-if scenarios can also include augmenting the computational infrastructure, if deemed necessary, to accommodate a workload imposed by a new application.

The techniques depicted in FIG. 3 can also, as described herein, be run on a system, wherein the system includes distinct software modules, each of the distinct software modules being embodied on a tangible computer-readable recordable storage medium. The distinct software modules can include, for example, a capacity planning workbench module, a compile-time instrumentation module, a run-time instrumentation module, a predictive inference engine module, a compile-time management metrics module, a run-time metrics management module, a visualization interface module and a compile-time optimizer module executing on a hardware processor.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
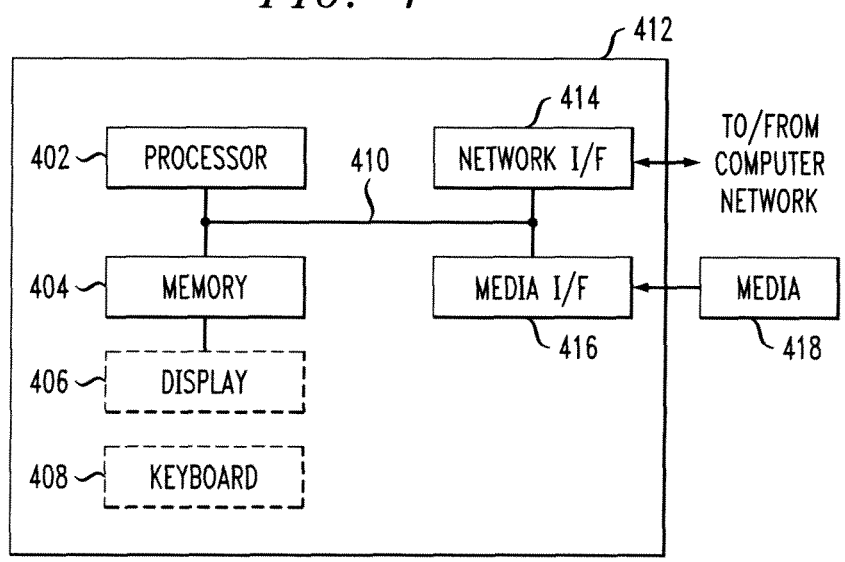
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, performing capacity planning and answering what-if questions as an application administrator gets ready to deploy a new application on top of the computational infrastructure.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for performing capacity planning for applications running on a computational infrastructure, wherein the method comprises:

instrumenting an application under development to receive one or more performance metrics under a physical deployment plan, wherein said instrumenting is carried out via a module executing on a hardware processor;

receiving the one or more performance metrics from the computational infrastructure hosting one or more applications that are currently running, wherein said receiving is carried out via a module executing on a hardware processor;

using a predictive inference engine to determine how the application under development can be deployed, wherein said predictive inference engine predicts performance of the application under development on top of the one or more applications currently running on the computational infrastructure under multiple hypothetical computational infrastructure deployment plans, and wherein said using a predictive engine is carried out via a module executing on a hardware processor; and using the determination to perform capacity planning for the applications on the computational infrastructure by identifying a computational infrastructure deployment plan from the multiple hypothetical computational infrastructure deployment plans that incurs no quality of service (QoS) violations for the application under development or the one or more applications currently running on the computational infrastructure, wherein said using the determination is carried out via a module executing on a hardware processor.

2. The method of claim 1, wherein the applications running on the computational infrastructure comprise multi-component applications running on the computational infrastructure.

3. The method of claim 1, wherein using a predictive inference engine to determine how the application under development can be deployed comprises determining whether a quality of service (QoS) threshold of any currently running application would be violated with deployment of the application under development.

4. The method of claim 1, wherein using a predictive inference engine to determine how the application under development can be deployed comprises determining a plan whereby all applications can run, wherein the plan consists of changes in the application under development alone.

5. The method of claim 1, wherein using a predictive inference engine to determine how the application under development can be deployed comprises determining a plan whereby all applications can run, wherein the plan comprises at least one change in the applications that are already running and changes in the application under development.

6. The method of claim 1, further comprising performing capacity planning for one or more what-if scenarios.

7. The method of claim 6, further comprising providing a visualization environment to carry out capacity planning one or more what-if scenarios.

8. The method of claim 6, wherein performing capacity planning for one or more what-if scenarios comprises determining whether a particular application deployment is feasible.

9. The method of claim 6, wherein performing capacity planning for one or more what-if scenarios comprises visualizing an impact of an application deployment plan on existing applications and the computational environment.

10. The method of claim 6, wherein performing capacity planning for one or more what-if scenarios comprises modifying a deployment plan and re-assessing the modified application deployment impact.

11. The method of claim 6, wherein performing capacity planning for one or more what-if scenarios comprises visualizing one or more alternate deployment plans, wherein the one or more alternate deployment plans comprise changes in the application under development and the already running applications.

12. The method of claim of claim 6, wherein performing capacity planning for one or more what-if scenarios comprises augmenting the computational infrastructure, if deemed necessary, to accommodate a workload imposed by a new application.

13. The method of claim 1, further comprising providing a system, wherein the system comprises one or more distinct software modules, each of the one or more distinct software modules being embodied on a tangible computer-readable recordable storage medium, and wherein the one or more distinct software modules comprise a capacity planning workbench module, a compile-time instrumentation module, a run-time instrumentation module, a predictive inference engine module, a compile-time metrics management module, a run-time metrics management module, a visualization interface module and a compile-time optimizer module executing on a hardware processor.

14. A computer program product comprising a tangible non-transitory computer readable recordable storage medium including computer useable program code for performing capacity planning for applications running on a computational infrastructure, the computer program product including:

computer useable program code for instrumenting an application under development to receive one or more performance metrics under a physical deployment plan;

computer useable program code for receiving the one or more performance metrics from the computational infrastructure hosting one or more applications that are currently running;

computer useable program code for using a predictive inference engine to determine how the application under development can be deployed, wherein said predictive inference engine predicts performance of the application under development on top of the one or more applications currently running on the computational infrastructure under multiple hypothetical computational infrastructure deployment plans; and computer useable program code for using the determination to perform capacity planning for the applications on the computational infrastructure by identifying a computational infrastructure deployment plan from the multiple hypothetical computational infrastructure deployment plans that incurs no quality of service (QoS) violations for the application under development or the one or more applications currently running on the computational infrastructure.

15. The computer program product of claim 14, wherein the computer useable program code for using a predictive inference engine to determine how the application under development can be deployed comprises computer useable program code for determining whether a quality of service (QoS) threshold of any currently running application would be violated with deployment of the application under development.

16. The computer program product of claim 14, wherein the computer useable program code for using a predictive inference engine to determine how the application under development can be deployed comprises computer useable program code for determining a plan whereby all applications can run, wherein the plan consists of changes in the application under development alone.

17. The computer program product of claim 14, wherein the computer useable program code for using a predictive inference engine to determine how the application under development can be deployed comprises computer useable program code for determining a plan whereby all applications can run, wherein the plan comprises at least one change in the applications that are already running and changes in the application under development.

18. The computer program product of claim 14, further comprising:

computer useable program code for performing capacity planning for one or more what-if scenarios, wherein the computer useable program code for performing capacity planning for one or more what-if scenarios comprises:

computer useable program code for determining whether a particular application deployment is feasible;

computer useable program code for visualizing an impact of an application deployment plan on existing applications and the computational environment;

computer useable program code for modifying a deployment plan and re-assessing the modified application deployment impact;

computer useable program code for visualizing one or more alternate deployment plans, wherein the one or more alternate deployment plans comprise changes in the application under development and the already running applications; and computer useable program code for augmenting the computational infrastructure, if deemed necessary, to accommodate a workload imposed by a new application.

19. The computer program product of claim 14, wherein the computer useable program code comprises one or more distinct software modules, and wherein the one or more distinct software modules comprise a capacity planning workbench module, a compile-time instrumentation module, a run-time instrumentation module, a predictive inference engine module, a compile-time metrics management module, a run-time metrics management module, a visualization interface module and a compile-time optimizer module executing on a hardware processor.

20. A system for performing capacity planning for applications running on a computational infrastructure, comprising:

a memory; and at least one processor coupled to the memory and operative to:

instrument an application under development to receive one or more performance metrics under a physical deployment plan;

receive the one or more performance metrics from the computational infrastructure hosting one or more applications that are currently running;

use a predictive inference engine to determine how the application under development can be deployed, wherein said predictive inference engine predicts performance of the application under development on top of the one or more applications currently running on the computational infrastructure under multiple hypothetical computational infrastructure deployment plans; and use the determination to perform capacity planning for the applications on the computational infrastructure by identifying a computational infrastructure deployment plan from the multiple hypothetical computational infrastructure deployment plans that incurs no quality of service (QoS) violations for the application under development or the one or more applications currently running on the computational infrastructure.

21. The system of claim 20, wherein the at least one processor coupled to the memory operative to use a predictive inference engine to determine how the application under development can be deployed is further operative to determine whether a quality of service (QoS) threshold of any currently running application would be violated with deployment of the application under development.

22. The system of claim 20, wherein the at least one processor coupled to the memory operative to use a predictive inference engine to determine how the application under development can be deployed is further operative to determine a plan whereby all applications can run, wherein the plan consists of changes in the application under development alone.

23. The system of claim 20, wherein the at least one processor coupled to the memory is further operative to:

perform capacity planning for one or more what-if scenarios, wherein the at least one processor coupled to the memory operative to perform capacity planning for one or more what-if scenarios is further operative to:

determine whether a particular application deployment is feasible;

visualize an impact of an application deployment plan on existing applications and the computational environment;

modify a deployment plan and re-assessing the modified application deployment impact;

visualize one or more alternate deployment plans, wherein the one or more alternate deployment plans comprise changes in the application under development and the already running applications; and augment the computational infrastructure, if deemed necessary, to accommodate a workload imposed by a new application.

24. The system of claim 20, further comprising a tangible computer-readable recordable storage medium having one or more distinct software modules embodied thereon, wherein the one or more distinct software modules comprise a capacity planning workbench module, a compile-time instrumentation module, a run-time instrumentation module, a predictive inference engine module, a compile-time metrics management module, a run-time metrics management module, a visualization interface module and a compile-time optimizer module executing on a hardware processor.

25. An apparatus for performing capacity planning for applications running on a computational infrastructure, the apparatus comprising:

means for instrumenting an application under development to receive one or more performance metrics under a physical deployment plan, wherein said means comprise a module executing on a hardware processor;

means for receiving the one or more performance metrics from the computational infrastructure hosting one or more applications that are currently running, wherein said means comprise a module executing on a hardware processor;

means for using a predictive inference engine to determine how the application under development can be deployed, wherein said predictive inference engine predicts performance of the application under development on top of the one or more applications currently running on the computational infrastructure under multiple hypothetical computational infrastructure deployment plans, and wherein said means comprise a module executing on a hardware processor; and means for using the determination to perform capacity planning for the applications on the computational infrastructure by identifying a computational infrastructure deployment plan from the multiple hypothetical computational infrastructure deployment plans that incurs no quality of service (QoS) violations for the application under development or the one or more applications currently running on the computational infrastructure, wherein said means comprise a module executing on a hardware processor.

* * * * *